(12) United States Patent
Knoth et al.

(10) Patent No.: US 9,581,205 B2
(45) Date of Patent: Feb. 28, 2017

(54) COUPLING ELEMENT WITH NON-REGULAR SHAFT INTERFACE

(71) Applicant: GM GLOBAL TECHNOLOGY OPERATIONS LLC, Detroit, MI (US)

(72) Inventors: Richard A. Knoth, Lake Orion, MI (US); Ricky L. Callender, Waterford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 852 days.

(21) Appl. No.: 13/959,159

(22) Filed: Aug. 5, 2013

(65) Prior Publication Data

US 2015/0037093 A1 Feb. 5, 2015

(51) Int. Cl.
*F16D 1/08* (2006.01)
(52) U.S. Cl.
CPC ........ F16D 1/0864 (2013.01); *Y10T 29/49947* (2015.01); *Y10T 403/70* (2015.01); *Y10T 403/7075* (2015.01)
(58) Field of Classification Search
CPC .......... F16D 1/0864; F16D 1/076; F16D 1/08; F16D 1/0805; F16D 3/185; Y10T 403/70; Y10T 403/7075; Y10T 29/49947; B21D 39/04; B62D 1/16; B62D 1/20
See application file for complete search history.

(56) References Cited

U.S. PATENT DOCUMENTS

| | | | | |
|---|---|---|---|---|
| 3,612,582 A | * | 10/1971 | Pitner | B21K 25/00 403/290 |
| 3,940,946 A | * | 3/1976 | Andersen | F16D 3/20 403/383 |
| 4,208,927 A | * | 6/1980 | Kennis | B60R 25/02 74/493 |
| 4,283,158 A | * | 8/1981 | Takahata | F16D 1/116 403/322.2 |
| 4,628,758 A | * | 12/1986 | Yuzuriha | B62D 1/20 403/14 |
| 4,927,286 A | * | 5/1990 | Hobluigie | B62D 1/16 403/322.2 |

(Continued)

FOREIGN PATENT DOCUMENTS

DE 3727775 C1 * 8/1988 ............... F16D 1/04
FR 2547372 A1 * 12/1984 ........... F16D 1/0864

*Primary Examiner* — Joshua J Michener
*Assistant Examiner* — Matthew Gitlin
(74) *Attorney, Agent, or Firm* — Quinn Law Group, PLLC

(57) ABSTRACT

A shaft coupling assembly includes a shaft coupling element having a coupling wall defining a channel configured to receive a shaft end of a shaft. The channel includes a coupling interface configured to mate to a shaft interface defined by the shaft end. Each of the coupling interface and the shaft interface define a mating non-regular shape, which may be configured as one of an irregular polygon and a hybrid polygon including linear and non-linear sides. The shaft coupling element includes a fastener bore and a counterbore having an axial counterbore depth greater than an axial depth of the fastener bore. The shaft end inserted in the channel to an inserted depth greater than the fastener bore depth and less than the axial counterbore depth is displaceable into the counterbore such that the shaft end is not engaged with the coupling interface by the fastener bore receiving the fastener.

16 Claims, 4 Drawing Sheets

(56) References Cited

U.S. PATENT DOCUMENTS

| | | | | |
|---|---|---|---|---|
| 5,253,949 A * | 10/1993 | Oxley | | B62D 1/16 403/155 |
| 5,318,375 A * | 6/1994 | Entrup | | F16D 1/0894 403/322.1 |
| 5,358,350 A * | 10/1994 | Oertle | | B62D 1/20 403/12 |
| 5,628,578 A * | 5/1997 | McClanahan | | B62D 1/16 403/13 |
| 5,716,279 A * | 2/1998 | Ham | | F16D 3/185 464/159 |
| 6,155,739 A * | 12/2000 | Sekine | | B62D 1/16 403/12 |
| 6,739,790 B1 * | 5/2004 | Crudele | | B62D 1/20 403/109.6 |
| 6,942,415 B2 * | 9/2005 | Whitton | | F16B 21/16 403/12 |
| 7,682,067 B2 * | 3/2010 | West | | B01F 7/001 366/331 |
| 7,891,902 B2 * | 2/2011 | Pettey | | F16C 3/00 403/305 |
| 8,038,362 B2 * | 10/2011 | Kawanabe | | F16D 1/0864 403/11 |
| 8,506,198 B2 * | 8/2013 | West | | B23P 11/00 366/331 |
| 2006/0073902 A1 * | 4/2006 | Sekine | | B62D 1/16 464/134 |
| 2011/0129294 A1 * | 6/2011 | Hoshino | | B62D 1/16 403/376 |
| 2013/0102399 A1 * | 4/2013 | Kim | | B62D 1/16 464/162 |
| 2014/0178127 A1 * | 6/2014 | Mottier | | B62D 1/20 403/373 |

* cited by examiner

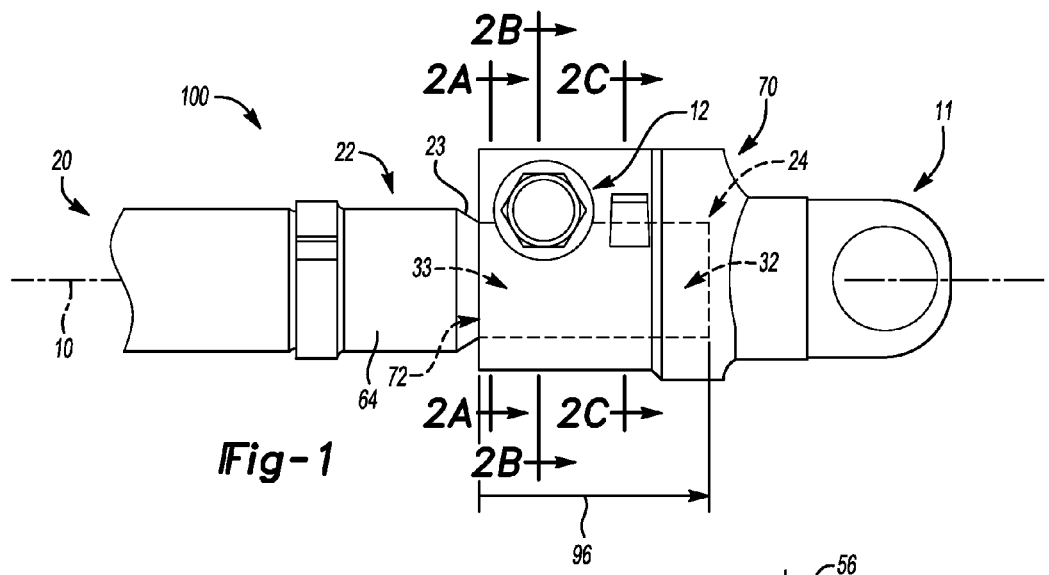
Fig-1
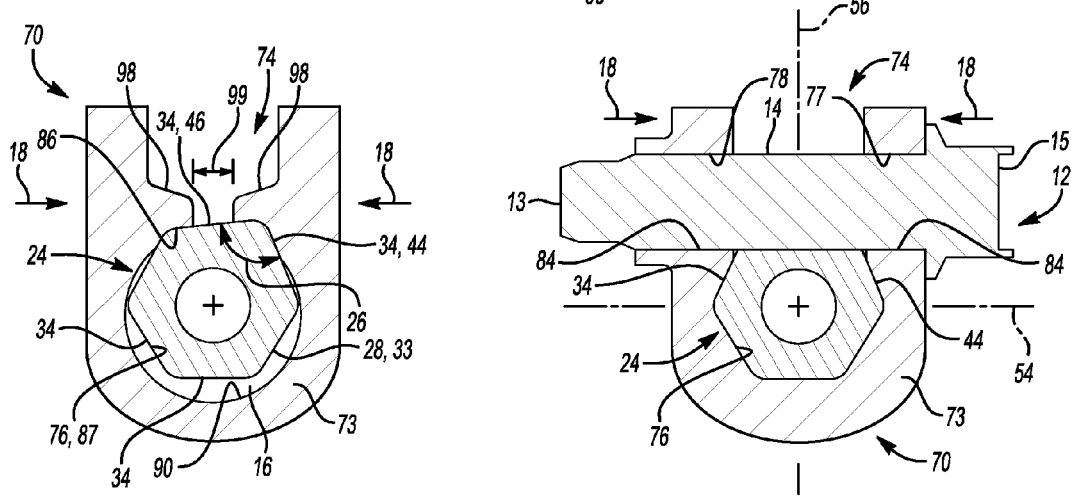
Fig-2A
Fig-2B
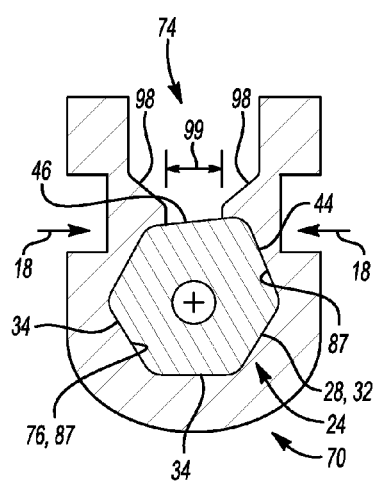
Fig-2C

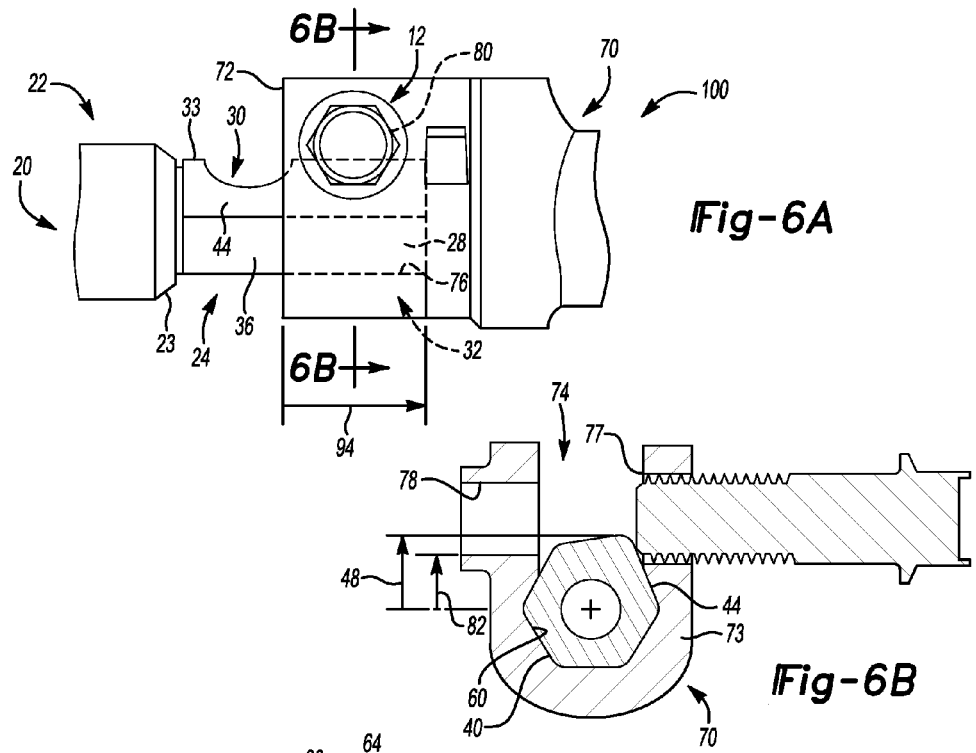
*Fig-6A*
*Fig-6B*
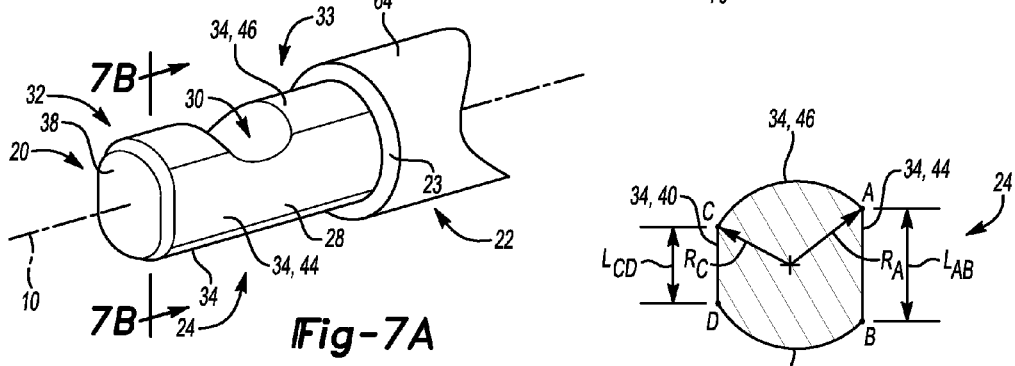
*Fig-7A*
*Fig-7B*
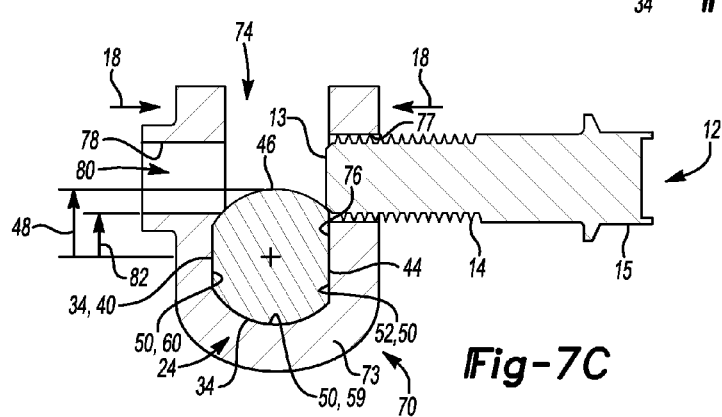
*Fig-7C*

COUPLING ELEMENT WITH NON-REGULAR SHAFT INTERFACE

TECHNICAL FIELD

The present invention relates to a shaft assembly including a shaft and a coupling element.

BACKGROUND

Shafts are utilized in many applications and generally require interconnection between the shaft and a secondary component. The secondary component can be an independent component or a secondary shaft such that the interconnected shaft serves as an intermediate shaft. An end of the shaft may be interconnected with a coupling element which may in turn be interconnected with a secondary component, which may be another shaft.

In some applications, for example, a steering intermediate shaft, interconnection of the end of the shaft and the coupling element may be required in a location or under conditions of limited accessibility and/or visibility, such that visual verification of installation of the shaft end into the coupling element at the required installed depth and/or orientation may be difficult or impossible prior to and/or after inserting a retaining fastener, such as a retaining bolt, in a fastener bore and prior to and/or after engaging the inserted fastener to the coupling element. In this situation, an installer may manually manipulate the shaft relative to the coupling element after engaging the fastener to assess whether the shaft end and the coupling element are engaged; however such manipulation is subjective and may provide a false sense that an improperly inserted shaft end is properly installed.

SUMMARY

A shaft coupling assembly and method of assembly is described herein with the shaft coupling assembly configured such that a fastener cannot be inserted through a fastener bore defined by the coupling element and engaged without having one of two conditions present. In a first condition, referred to herein as the installed position, the shaft end must be inserted to a required installed depth such that a fastener receiving recess defined by the shaft end is aligned with the fastener bore to receive the fastener inserted through the bore, where engagement of the fastener to the coupling element after insertion of the fastener through the fastener bore and the shaft causes the coupling element to exert a clamping force on a shaft interface defined by the shaft end. The fastener fixedly positioned in the recess and the clamping force exerted on the shaft interface engage the shaft end in the coupling element to prevent axial and radial movement of the shaft end relative to the coupling element.

The shaft interface includes a plurality of shaft faces configured such that a transverse cross-section of the shaft interface is characterized by a "non-regular shape," as that term is defined herein. The coupling element includes a coupling interface having a plurality of coupling faces corresponding, e.g., configured to mate to the shaft faces, such that in the installed position each shaft face is proximate a corresponding, e.g., mating coupling face, such that each of the coupling faces exerts a clamping force on its mating shaft face. In one example, the non-regular shape of the transverse cross-section of the shaft end and mating non-regular shape of the corresponding coupling interface is configured as an irregular or non-regular polygon, which may be, for example, an irregular hexagon. In another example, the non-regular shape of the transverse cross-section of the mating shaft end and coupling interface is configured as a truncated cylinder having opposing flat sides of different lengths, which may also be referred to herein as a non-regular double D shape.

In a second condition, the shaft end is inserted via a receiving end of the coupling element into a receiving portion of the coupling channel such that a leading portion of the shaft end protrudes into the fastener bore without engaging a terminating portion of the coupling channel and such that insertion of the fastener in the fastener bore interferes with the leading portion of the shaft end to displace the shaft end axially relative to the coupling element, providing a visual indicator that the shaft end is not engaged to the coupling element. The shaft end may be displaced into a counterbore defined by the receiving portion of the coupling element, where the counterbore is configured such that, should the fastener be inserted through the fastener hole and engaged to the coupling element, the shaft end remains unengaged with the terminating portion of the coupling channel, and as such the shaft end is readily removable from the coupling element upon manual manipulation of the shaft relative to the coupling element, e.g., such that the unengaged condition of the shaft end is obvious and/or highly detectable.

The shaft provided herein includes a shaft body and a shaft end. The shaft end extends axially from the shaft body, and includes a fastener receiving recess and a shaft interface. The shaft end may be separated from the shaft body by a chamfer or similar transition surface, such that the shaft interface is noncontiguous with the surface of the shaft body. The shaft interface is defined by a plurality of shaft faces configured such that the transverse cross-section of the shaft end has a non-regular shape. The plurality of shaft faces includes at least a first, second and third shaft face, wherein the second shaft face is adjacent and connected to the first shaft face, and is disposed between the first and third shaft faces. The fastener receiving recess is in communication with and at least partially transverses the first and second shaft faces. In one example, the non-regular cross-sectional shape defined by the plurality of shaft faces is an irregular polygon and the included angle defined by the first and second shaft faces is not equal to at least one other included angle defined by the plurality of shaft faces. In one example, the irregular polygon may be configured as an irregular hexagon. In another example, the non-regular cross-sectional shape defined by the plurality of shaft faces is an irregular double D shape, e.g., a truncated cylinder with the first truncated shaft face having a face length greater than the truncated face length of the opposing third shaft face.

A coupling element includes a wall portion defining a channel accessible via a shaft receiving aperture of the coupling element, the wall portion further including opposing bore apertures defining a fastener bore in communication with and generally transverse to the channel. The channel includes a coupling interface defined by a plurality of coupling faces which correspond, respectively, to the plurality of shaft faces defining the shaft interface, such that the transverse cross-section of the coupling interface has a non-regular shape. The channel includes a receiving portion in communication with the shaft receiving aperture and the fastener bore, and a terminating portion in communication with the fastener bore. The receiving portion includes opposing retention features partially defined by the coupling interface and a counterbore opposing the fastener bore and in communication with the shaft receiving aperture of the coupling element such that the counterbore extends axially into the channel for the length of the receiving portion. The counterbore extends radially into the coupling wall to define a generally radial gap relative to the terminating portion of the channel. The receiving portion including the counterbore is characterized by an axial depth which is greater than an axial depth of the fastener bore such that, with the shaft end inserted into the receiving portion of the channel, the leading end of the shaft protrudes into the fastener bore without engaging the leading portion of the shaft end with the terminating portion of the channel.

An assembly method is provided herein, where the shaft end is progressively inserted into a channel of the coupling element, where the channel is in communication with the fastener bore of the coupling element. At an insertion depth less than the counterbore depth, the leading portion of the shaft end is not engaged to the terminating portion of the coupling interface. At each insertion depth other than the required installed depth, the leading portion is engaged with the coupling interface such that a feature of the shaft end protrudes into the fastener bore to prevent insertion of the fastener through the fastener bore, thereby preventing engagement of the fastener to the coupling element with the shaft end in a non-installed position.

The configuration of the shaft end and coupling element described herein enables verification of the shaft end in the installed position prior to engaging the inserted fastener to the coupling element and without visual verification, and therefore enables assembly of a shaft coupling assembly in an application and/or installation location where visual accessibility of the shaft end and coupling element may be limited or not possible.

The above features and other features and advantages of the present invention are readily apparent from the following detailed description of the best modes for carrying out the invention when taken in connection with the accompanying drawings.

BRIEF DESCRIPTION OF THE DRAWINGS

FIG. 1 is a partial schematic side view of a shaft coupling assembly including a shaft having a shaft end engaged to a coupling element with a fastener, and showing the shaft end in a fully engaged position and at an installed depth relative to the coupling element;

FIG. 2A is a partial cross-sectional view of section 2A-2A of FIG. 1 showing a trailing portion of a shaft interface engaged with a receiving portion of a coupling interface, with the shaft end engaged at the installed depth;

FIG. 2B is a partial cross-sectional view of section 2B-2B of FIG. 1 showing the fastener engaging a recess defined by the shaft end, with the shaft end engaged at the installed depth;

FIG. 2C is a partial cross-sectional view of section 2C-2C of FIG. 1 showing a leading portion of the shaft interface engaged with a terminating portion of the coupling interface, with the shaft end engaged at the installed depth;

FIG. 6A is a partial schematic side view showing the coupling assembly of the shaft of FIG. 1 with the shaft partially inserted into the coupling in a second position;

FIG. 6B is a schematic cross-sectional view of section 6B-6B of FIG. 6A showing a transverse cross-section of the leading portion of the shaft engaged in the coupling element in the second position and at a second inserted depth;

FIG. 7A is a partial schematic perspective view of a shaft including a second example shaft end;

FIG. 7B is a cross-sectional view of section 7B-7B of the shaft end of FIG. 7A; and FIG. 7C is transverse cross-section of the leading portion of the shaft end of FIG. 7A engaged in the coupling element at the second inserted depth.

DETAILED DESCRIPTION

Figure 3A:
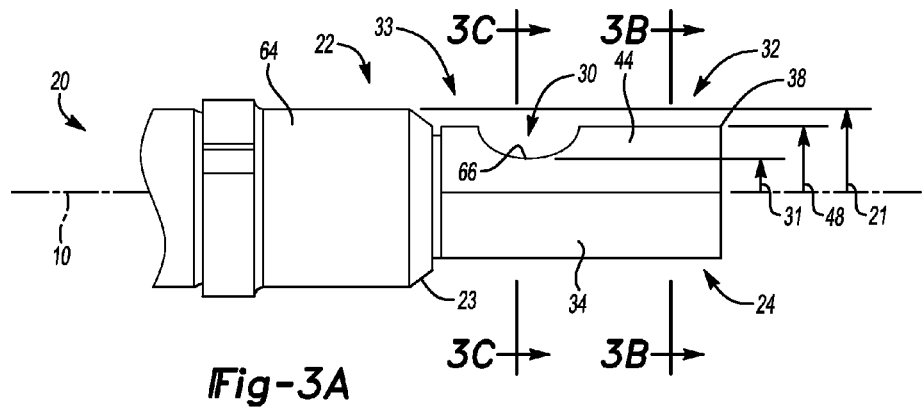
FIG. 3A is a schematic side view of the shaft of FIG. 1.

Referring to the drawings wherein like reference numbers represent like components throughout the several figures. The elements shown in FIGS. 1-7C are not to scale or proportion. Accordingly, the particular dimensions and applications provided in the drawings presented herein are not to be considered limiting. Certain terminology, for example, "upper," "lower," "clockwise," "counterclockwise," "horizontal," "vertical," is used herein for relative descriptive clarity only and is not intended to be limiting.

Figure 4A:
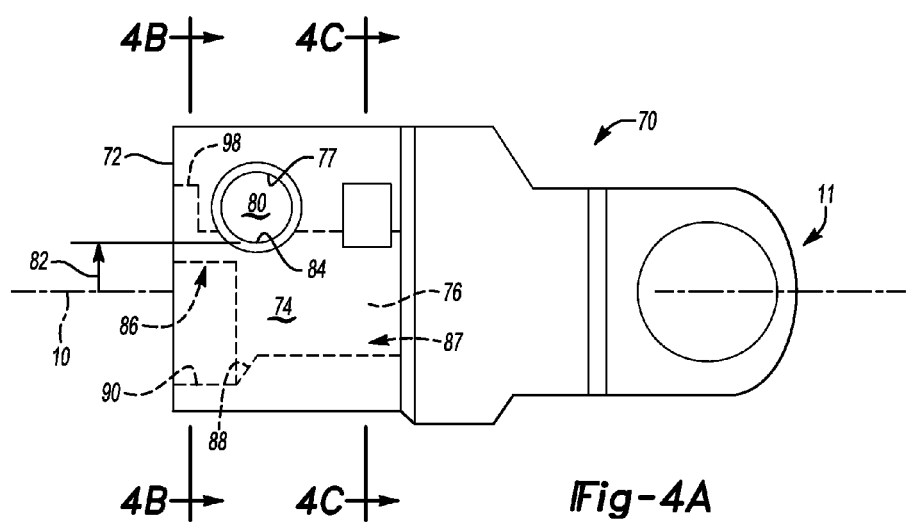
FIG. 4A is a schematic side view of the terminating portion of the coupling element of FIG. 1.

Referring to FIGS. 1, 3A and 4A, a shaft is shown generally indicated at 20. The shaft 20 includes a shaft body 22 and a shaft end 24. The shaft 20 may be assembled to a coupling element generally indicated at 70 in FIGS. 1 and 4A, where in the installed position shown in FIG. 1 the shaft end 24 is inserted to an installed depth 96 such the shaft end 24 is engaged in a channel 74 defined by the coupling element 70 and the shaft end 24 is retained in the installed position in the channel 74 by a fastener 12 inserted through a fastener bore 80 and a fastener receiving recess 30 defined by the shaft end 24. The fastener bore 80 is defined by the coupling element 70 where the fastener 12 engages the coupling element 70 as shown in FIG. 1 to cause a coupling interface 76 of the coupling element 70 to exert a clamping force 18 on a shaft interface 28 of the shaft end 24, thus forming the shaft coupling assembly generally indicated at 100 in FIG. 1. In a non-limiting example, the shaft coupling assembly 100 may be configured for use as a steering shaft coupling assembly 100, where the shaft 20 may be configured as a steering shaft 20 or a steering intermediate shaft 20.

As used herein, "installed position," "installed depth 96," and "installed orientation" shall refer only to a specific condition where the shaft end 24 is positioned and/or oriented relative to the coupling element 70 as required for proper engagement of the shaft end 24 to the coupling element 70 by a fastener 12 inserted through the fastener bore 80 and engaged to the coupling element 70. Other terms not including the word "installed," such as "inserted position," "insertion depth," and "inserted orientation" shall refer to conditions where the shaft end 24 is not positioned and/or is not oriented relative to the coupling element 70 as required for proper engagement of the shaft end 24 to the coupling element 70 by a fastener 12 inserted through the fastener bore 80 and engaged to the coupling element 70. Throughout the figures, the terms "upper," "lower," and "bottom" shall be relative to a horizontal mid-plane defined by a shaft longitudinal axis 10 and a shaft horizontal axis 54 shown in FIGS. 1, 2B and 3A, where with the shaft end 24 engaged with the coupling element 70 in the installed position shown in FIG. 1, the longitudinal axis 10 of shaft 20 and the longitudinal axis 10 of the channel 74 of the coupling element 70 are substantially coincident, and the horizontal axis 54 and horizontal mid-plane is substantially parallel to the axis of a fastener bore 80 defined by the coupling element 70, where the terms "substantially coincident" and "substantially parallel" are intended to be interpreted, respectively, as "coincident" and "parallel" within the customary manufacturing tolerances of the respective components such that these terms are not overly broad. A vertical axis 56 is orthogonal to and bisects the longitudinal and horizontal axes 10, 54. The terms "clockwise" and "counterclockwise" as used herein shall refer to the direction of rotation about the longitudinal axis 10 as viewed from the perspective of section 2B-2B shown in FIG. 2B.

As shown in FIG. 1, the shaft 20 includes a shaft body generally indicated at 22 and a shaft end generally indicated at 24. The shaft body 22 has a shaft radius 21 (see FIG. 3A) which defines a shaft surface 64. In the example shown the shaft surface 64 terminates in a chamfer 23, such that the shaft radius 21 is larger than a vertical height 48 of the shaft interface 28 (see FIG. 3A) where the larger shaft radius 21 and the chamfer 23 may interfere with a shaft receiving aperture 72 of the coupling element 70 to prevent over insertion of the shaft end 24 into the channel 74 of the coupling element 70, e.g., insertion of the shaft end 24 to an insertion depth greater than the installed depth 96 shown in FIG. 2B.

Figure 3B:
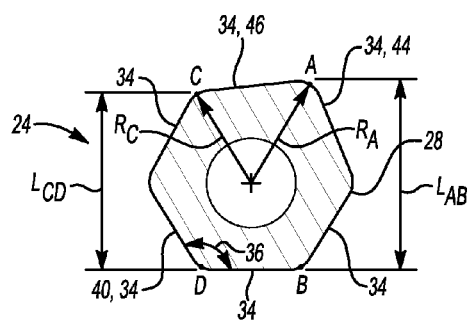
FIG. 3B is a cross-sectional view of section 3B-3B of the leading portion of the shaft of FIG. 3A.
Figure 3C:
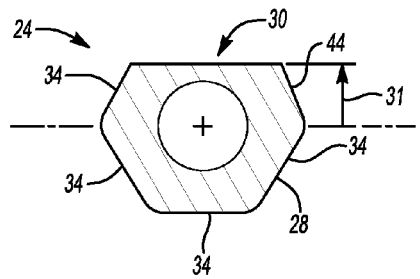
FIG. 3C is a cross-sectional view of section 3C-3C of the shaft of FIG. 3A, including the fastener receiving recess.

As shown in FIGS. 3A-3C, the shaft end 24 extends axially from the shaft body 22 and defines a shaft interface 28 including a plurality of shaft faces 34, a leading portion 32, and a trailing portion 33. A fastener receiving recess 30 is intermediate the shaft interface 28, such that the fastener receiving recess 30 is partially defined by the leading portion 32 and the trailing portion 33. The fastener receiving recess 30, referred to herein as the recess 30, is configured such that in the installed position shown in FIG. 1, the recess 30 defines a profile including a recess bottom 66 which is non-interfering with the fastener bore 80 such that in the installed position a fastener 12 may be inserted through the fastener bore 80 and received in the recess 30. The recess 30 has a recess radial height 31 relative to the shaft longitudinal axis 10 and the recess bottom 66. As shown in FIG. 3A, the recess radial height 31 in a non-interfering condition with the fastener bore 80 may be the same as or less than a bore radial height 82 defined by the fastener bore 80 bottom and the longitudinal axis 10 and shown in FIG. 4A. In one example, the recess radial height 31 and the fastener bore radial height 82 are substantially the same, e.g., the same within customary manufacturing tolerance of the components, such that in the installed position the recess 30 partially defines the fastener bore 80. Referring to FIGS. 2A-2C, the recess 30 is at least partially defined by a first shaft face 44 and a second shaft face 46 adjacent the first shaft face 44. The first shaft face 44 in the installed position is adjacent a receiving bore aperture 77, and the second shaft face 46 in the installed position is in communication with a radial space 99 defined by the coupling element 70.

As shown in FIG. 2B, in the installed position a shank portion 14 of the fastener 12 engages the recess 30 and interferes with the shaft leading and trailing portions 32, 33 of the shaft end 24 to retain the shaft end 24 in the coupling element 70 and to prevent axial movement of the shaft end 24 relative to the coupling element 70. In the example shown the recess 30 is configured as a slot or a whistle-notch. The example is non-limiting and it would be understood that other configurations of the recess 30, for example, a recess 30 in the shape of an annular groove may be used.

The shaft interface 28 is configured to engage with a coupling interface 76 defined by the coupling element 70, such that in the installed position and with the fastener 12 extended through the fastener bore 80 and engaged with the coupling element 70, the coupling interface 76 exerts a clamping force 18 as shown in FIGS. 2A-2C on the shaft interface 28 to retain the shaft end 24 in the coupling element 70 to prevent axial movement of the shaft end 24 relative to the coupling element 70. The shaft interface 28 includes a plurality of shaft faces 34 and the coupling interface 76 includes a plurality of corresponding coupling faces 50 for engaging and/or orienting the shaft interface 28 with the coupling interface 76, and to prevent radial movement of the shaft end 24 in the channel 74 about the longitudinal axis 10. As used herein, elements identified as corresponding, such as a shaft face and corresponding coupling face, are configured to interface in a mating relationship, and may be referred herein interchangeably as "corresponding" or "mating" elements. In the example shown, the shaft faces 34 are configured such that the transverse cross-section of the shaft end 24, e.g., the transverse cross-section of the shaft interface 28 shown for example in FIG. 3B, defines a non-regular shape. Similarly, the corresponding coupling faces 50 are configured such that the transverse cross-section of the channel 74 defining the coupling interface 76, e.g., the transverse cross-section of the coupling interface 76 shown for example in FIG. 4C, defines a corresponding non-regular shape configured to mate with the non-regular shape defined by the shaft interface 28 when the shaft end 24 is inserted in the channel 74.

As used herein, a "non-regular shape" is a shape including a plurality of sides and is at least one of a non-uniform shape, an asymmetrical shape, and an irregular shape. In one example, a "non-regular shape" may be configured as an irregular polygon including a plurality of sides, as illustrated by the example shown in FIGS. 1-6B, wherein each side of the non-regular shape defined by the transverse cross-section of the shaft interface 28 is defined by a shaft face 34 of the shaft interface 28. The irregular polygon, e.g., the non-regular shape, may have an included angle 26 (see FIG. 2A) defined by a first shaft face (side) 44 and a second shaft face (side) 46 is non-regular, e.g., different from at least one other included angle 36 (see FIG. 3B) defined by at least another shaft face (side), such as a third shaft face 40 and its adjacent shaft face 34. The non-regular shape shown in FIGS. 1-6B may be characterized by first and second vertical lengths $L_{AB}$, $L_{CD}$ shown in FIG. 3B. In the example shown, the vertical lengths $L_{AB}$ and $L_{CD}$ are unequal, e.g., the first vertical length $L_{AB}$ is longer than the second vertical length $L_{CD}$, such that the non-regular shape of the cross-section shown in FIG. 3B is asymmetrical relative to the horizontal axis 54, and asymmetrical relative to the vertical axis 56. (see FIG. 2B). The first vertical length $L_{AB}$ originates from reference point A, e.g., the intersection of the first and second shaft faces 44, 46, and is parallel to a plane defined by the longitudinal axis 10 and the vertical axis 56 (see FIGS. 1 and 2B), such that the first vertical length $L_{AB}$ corresponds to the vertical height 48 of the shaft interface 28 (see FIG. 3B) relative to the longitudinal axis 10, which is the vertical height 48 of the leading portion 32 of the shaft end 24 protruding into the fastener bore 80 when the shaft end 24 is oriented to the coupling interface 76 and inserted into the channel 74 at either of a first inserted depth 92 and a second inserted depth 94. In the example shown in FIG. 3C, the non-regular shape is configured as an irregular hexagon, such that reference points A, B, C, D are defined by the intersection of adjacent shaft faces 34. The second vertical length $L_{CD}$ corresponds to a vertical height originating from the intersection of the second shaft face 46 and its other adjacent shaft face 34 at the reference point C, and is parallel to a plane defined by the longitudinal axis 10 and the vertical axis 56 (see FIGS. 1 and 2B).

Referring again to FIG. 3B, the "non-regular shape" may be characterized by a radius $R_A$ drawn to a first intersection A between two adjacent shaft faces such as first and second shaft faces 44, 46, and a radius $R_C$ drawn to another reference point C which is the intersection point between two other adjacent shaft faces, where radii $R_A$ and $R_C$ not equal, e.g., are of different lengths.

In the example shown in FIGS. 1-6B, the "non-regular shape" of the transverse cross-section of the shaft end 24 is that of an irregular hexagon, also referred to as a non-regular hexagon. The example shown in FIGS. 1-6B is non-limiting, and it is understood that the shaft end 24 may be configured to include a transverse cross-section defined by another non-regular polygon shape, which may be, by non-limiting example, a non-regular rectangle, a non-regular pentagon, etc., and/or an irregular or non-regular polygon including at least two sides of different lengths.

A "non-regular shape," as that term is defined herein, may be a hybrid non-regular polygon including at least one linear side, and at least one non-linear side which may be a curvilinear side. In an example shown in FIGS. 7A-7C, the shaft end 24 shown in FIG. 7A includes a plurality of shaft faces 34 including at least one flat shaft face 44, 40 defining a linear side of the non-regular shape of the transverse cross-section of the shaft end shown in FIGS. 7B and 7C, and at least one non-flat shaft face 46 defining a non-linear side of the non-regular shape. In the example shown in FIGS. 7A-7C, the non-linear side may be defined by a portion of a curved or cylindrical face 46. The "non-regular shape" may include a first side 44 having a length $L_{AB}$, and an opposing side 40 having a different length $L_{CD}$, e.g., such that $L_{AB}$ and $L_{CD}$ are unequal. The opposing sides 44, 40 may be substantially parallel to each other, and/or to a plane defined by the longitudinal axis 10 and the vertical axis 56 such that the lengths $L_{AB}$ and $L_{CD}$ are vertical lengths of their respective faces 44, 40.

The "non-regular shape" may be characterized by a radius $R_A$ drawn to a first intersection A between two adjacent sides, such as shaft faces 44, 46, and a radius $R_C$ drawn to another intersection C between two other adjacent shaft faces, as shown in FIG. 7B, where radii $R_A$ and $R_C$ are of different lengths. In the example shown in FIGS. 7A-7C, the shaft end 24 is configured as a truncated cylinder, also referred to as a "double D" shaft end, having opposing truncated flat shaft faces 44, 40 which are substantially parallel to each other and disposed between opposing cylindrical faces 46. The shaft end 24 may be referred to as a "non-regular truncated cylinder," an "irregular truncated cylinder," or a "non-regular double D," characterized by the unequal lengths $L_{AB}$, $L_{CD}$ of the opposing truncated surfaces 44, 40. The example shown in FIGS. 7A-7C is non-limiting, and it is understood that the shaft end 24 may be configured to include a transverse cross-section defined by one of another non-regular shape, including one having non-parallel opposing sides of different lengths.

Referring again to FIGS. 2A-2C the coupling element 70 includes a shaft receiving aperture 72 in communication with the channel 74 configured to receive and engage the shaft end 24, where the channel 74 defines a coupling interface 76 corresponding to the shaft interface 28. The coupling element 70 may further define a connecting end 11 which may be configured to connect to a secondary component (not shown) such that the coupling element 70 operatively connects the shaft 20 to the secondary component, where the secondary component may be another shaft (not shown) or a different secondary component. The shaft end 24 may be received into the channel 74 via the shaft receiving aperture 72, where the shaft end 24 may be inserted into the channel 74 to various depths described further herein, including an inserted depth 92 shown in FIG. 5B, an inserted depth 94 shown in FIG. 6A, and an installed depth 96 shown in FIG. 1. The coupling element 70 includes opposing walls 73 defining the channel 74, each wall 73 including a bore aperture 77, 78 such that the first and second bore apertures 77, 78 collectively define the fastener bore 80 in communication with the channel 74.

As shown in FIG. 4A, a bore bottom 84 of the fastener bore 80 extends into the channel 74, such that when the shaft end 24 is installed in the coupling element 70 in the installed position, e.g., at an installed depth 96, the bore bottom 84 substantially aligns with the recess bottom 66 and/or is configured such that the recess 30 is accessible via the receiving bore aperture 77 to receive the fastener 12 inserted through the receiving bore aperture 77. The bore 80 is characterized by a radial bore height 82, as shown in FIG. 4C, defined as distance from the longitudinal axis 10 to the bore bottom 84. The bore 80 is further characterized by a bore depth 83 as shown in FIG. 5B, where the bore depth is defined as the axial depth from the end of the channel 74 in communication with the shaft receiving aperture 72 to the receiving bore aperture 77 and/or the fastener bore 80 defined by the bore apertures 77, 78.

Figure 5A:
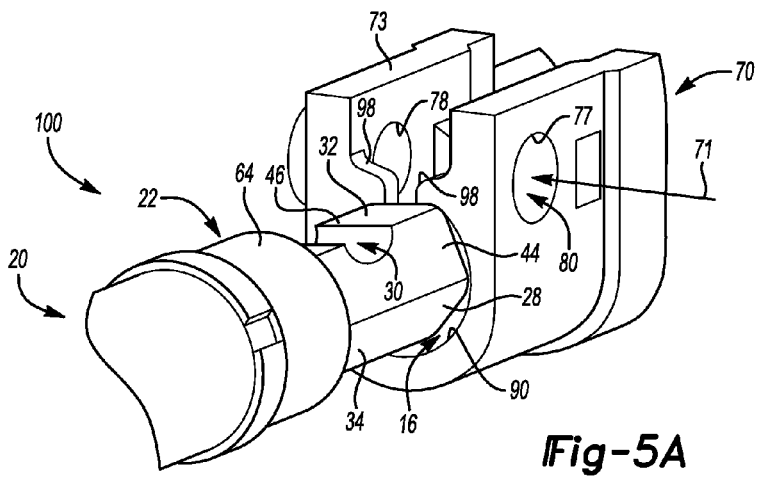
FIG. 5A is a partial schematic perspective view of the coupling assembly of FIG. 1 showing the shaft partially inserted into the coupling in a first position.
Figure 5B:
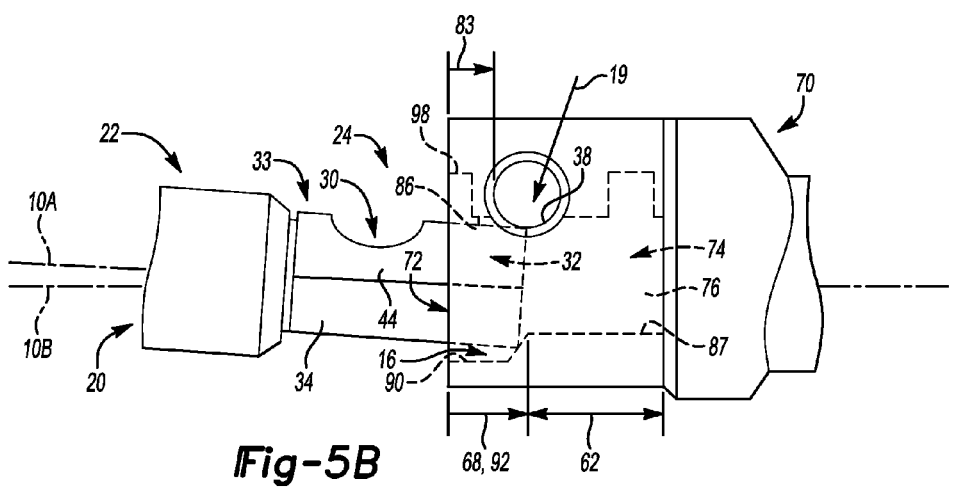
FIG. 5B is a is a partial schematic side view of FIG. 5A showing the shaft partially inserted into the coupling element in the first position and at a first inserted depth.

As shown in FIG. 5A, the first bore aperture 77 is a receiving bore aperture configured to receive a fastener inserted into the bore from an insertion direction 71, such that the receiving bore aperture 77 receives a fastener end 13 and shank portion 14 of the fastener 12, while retaining a fastener head 15 of the fastener 12 external to the coupling wall 73. The second bore aperture 78 is configured as an engaging bore aperture 78 to receive the fastener end 13 and engage the fastener 12 to the coupling element 70, where the fastener 12 may be engaged to the coupling element 70 such that a clamping force 18 is exerted by the coupling interface 76 on the shaft interface 28, for example, by engaging the fastener 12 to the coupling element 70 to draw the opposing walls 73 of the coupling element 70 toward each other, e.g., in the direction shown in FIG. 2C by the arrows indicating the clamping force 18. In one example, the fastener 12 may be configured as a threaded bolt and the engaging bore aperture 78 may be configured such that the threaded bolt may be engaged with the engaging bore aperture 78 to generate a prevailing torque thereby engaging the bolt fastener 12 to the coupling element 70, where the prevailing torque corresponds to the clamping force 18 exerted by the coupling interface 76 on the shaft interface 28. The example shown herein is not limiting, and it would be understood that other types of fasteners 12 and/or fastener 12 combinations may be used to engage the recess 30 via the fastener bore 80 and/or to retain the shaft end 24 to the coupling element 70 in an installed position. By way of non-limiting example, the fastener 12 may include a bolt having a prevailing torque element such as a locking screw thread, a torque prevailing coating such as Loctite™, a locking insert such as Nylok™, or a bolt and nut combination and/or bolt and cotter pin combination, etc.

The coupling interface 76 is defined by the channel 74, which includes a receiving portion 86 and a terminating portion 87. The receiving portion 86 has an axial depth corresponding to a counterbore depth 68, and the terminating portion 87 is characterized by an axial depth 62. The receiving portion 86 is in communication with the shaft receiving aperture 72 and the fastener bore 80 and receives the leading portion 32 of the shaft end 24 prior to engaging the leading portion 32 in the terminating portion 87 of the channel 74. The shaft end 24 is considered to be positioned in the receiving portion 86 when inserted in the channel 74 at an inserted depth no greater than the inserted depth 92 shown in FIG. 5B. The fastener bore 80 is intermediate the receiving portion 86 and the terminating portion 87, such that the terminating portion 87 is in communication with the fastener bore 80 and engages the leading portion 32 of the shaft end 24 when the shaft end 24 is in the installed position, e.g., when the shaft end 24 is positioned in the channel 74 at the installed depth 96 as shown in FIG. 1.

The coupling interface 76 includes a plurality of coupling faces 50 each corresponding to a respective shaft face 34. The plurality of coupling faces 50 are configured for engaging and/or orienting the shaft interface 28 in the channel 74 and with the coupling interface 76, such that the corresponding shaft faces 34 and coupling faces 50 mate to prevent radial movement of the shaft end 24 in the channel 74 about the longitudinal axis 10. In the example shown, the coupling faces 50 are configured such that the transverse cross-section of the channel 74, specifically, the transverse cross-section of the coupling interface 76, defines a non-regular shape. As described previously, a "non-regular shape" as that term is used and defined herein, is a shape including a plurality of sides which is configured as at least one of a non-uniform shape, an asymmetrical shape, and an irregular shape. Each of the sides of the non-regular shape of the transverse cross-section of the coupling interface 76 is defined by a coupling face 50 of the coupling interface 76. In one example, a "non-regular shape" may be configured as an irregular polygon having sides defined by a plurality of coupling faces 50, as illustrated by the example shown in FIGS. 1-6B, such that an included angle 26 defined by a first coupling face 52 and a second coupling face 58 is non-regular, e.g., different from at least one other included angle 36 (see FIG. 4C) defined by at least another coupling face, such as a third coupling face 50, and its adjacent coupling face. As described for the shaft end 24, the non-regular shape of the coupling interface 76 shown in FIGS. 4B-4C may be characterized by first and second vertical lengths which are not equal and correspond respectively to the first vertical length $L_{AB}$ and the second vertical length $L_{CD}$. The "non-regular shape" of the channel 74 shown in FIGS. 4B-4C may be characterized by a first radius corresponding to radius $R_A$ of the shaft end 24 and drawn to a first intersection between two adjacent sides, such as sides 52, 58, and a second radius corresponding to $R_C$ of the shaft end 24 and drawn to another intersection C between two other adjacent coupling faces, where the first and second radii defined by the coupling interface 76 and corresponding to radii $R_A$ and $R_C$ are of different lengths.

In another example shown in FIGS. 7A-7C, a "non-regular shape" of the coupling interface 76 shown in FIG. 7C may include a plurality of coupling faces 50 including at least one linear coupling face 52, 60 and at least one non-linear coupling face, which may be a coupling face 59 shown in FIG. 7C and/or a non-linear coupling face defined by the receiving portion 86 of the channel 74 (not shown) and corresponding to, e.g., configured to mate to the shaft face 46. The "non-regular shape" may include a first coupling face 52 having a length corresponding to, e.g., substantially the same as, the shaft face length $L_{AB}$, and an opposing coupling face 60 having a different length corresponding to, e.g., substantially the same as, the shaft face length $L_{CD}$, e.g., such that the lengths of coupling faces 52, 60 are unequal. The opposing coupling faces 52, 60 in the example shown are substantially parallel. The example is non-limiting, and it would be understood that a hybrid polygon including non-parallel linear sides may be used. The "non-regular shape" may be characterized by a first coupling radius corresponding to the shaft radius $R_A$ shown in FIG. 7B, drawn to a first intersection between two adjacent coupling faces, and a second coupling radius corresponding to the shaft radius $R_C$ drawn to another intersection between two other adjacent coupling faces, such that the first and second coupling radii are of different lengths.

In the installed position shown in FIG. 1, with the fastener 12 positioned in the fastener bore 80 and recess 30 and operatively fastened to the coupling element 70 such that the coupling interface 76 exerts a clamping force 18 on the shaft interface 28, each respective shaft face 34 is mated to and in proximate contact with its respective coupling face 50, such that operatively fastening the fastener 12 to the coupling element 70 causes a clamping force 18 to be exerted by each coupling face 50 on its mating shaft face 34 to restrain the shaft end 24 in the channel 74 and/or to constrain radial rotation of the shaft end 24 about the longitudinal axis 10 and relative to the channel 74. For example, operatively fastening the fastener 12 inserted through the fastener bore 80 and recess 30 causes the first coupling face 52 to exert a clamping force on the corresponding first shaft face 44, the second coupling face 58 to exert a clamping force on the corresponding second shaft face 46, the third coupling face 60 to exert a clamping force on the corresponding third shaft face 40, and so on.

Figure 4B:
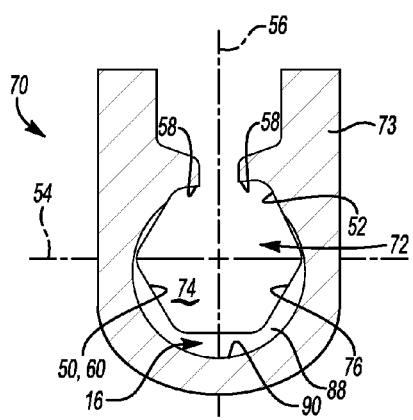
FIG. 4B is a cross-sectional view of section 4B-4B of the receiving portion of the coupling element of FIG. 4A.
Figure 4C:
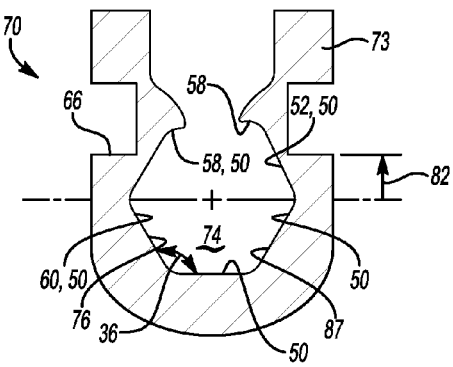
FIG. 4C is a cross-sectional view of section 4C-4C of the coupling element FIG. 4A.

FIG. 4B shows a transverse cross-section 4A-4A of the receiving portion 86 of the coupling element 70. The receiving portion 86 includes a first pair of opposing retention features 98, and a counterbore 90. As shown in FIGS. 4A and 4B, the counterbore 90 extends axially from the shaft receiving aperture 72 through the receiving portion 86 to a counterbore depth 68 shown in FIG. 5B, such that the axial depth of the receiving portion 86 corresponds to the counterbore depth 68. As shown in FIGS. 4B and 5A, the perimeter of the counterbore 90 is bounded by, e.g., terminates into the retention features 98, and the counterbore 90 extends radially into the coupling wall 73 to define a generally radial gap 16 having a width corresponding to the radial width of the counterbore base 88, where the counterbore base 88 defines a transition surface between the counter bore 90 and the terminating portion 87 of the coupling interface 76. The counterbore base 88 may be substantially perpendicular to the longitudinal axis 10 and the axial surface of the counterbore 90, or may define, as shown in FIG. 4A, a chamfered or tapered transition of the counterbore 90 to the terminating portion 87. As shown in FIG. 5B, the counterbore depth 68 is greater than the fastener bore depth 83, such that when the shaft end 24 is inserted into the channel 74 to a depth greater than the fastener bore depth 83 and less than the counterbore depth 68, the leading end 38 and/or the leading portion 32 of the shaft end 24 in alignment with the first pair of retention features 98 protrudes into the fastener bore 80 but does not engage the terminating portion 87 of the coupling element 70.

As shown in FIG. 4A, the first pair of opposing retention features 98 in the receiving portion 86 define the shaft receiving aperture 72, where the retention features 98 are partially defined by the first and second coupling faces 52, 58 of the coupling interface 76. The retention features 98 extend radially toward each other such that when the leading end 38 of the leading portion 32 is inserted into the channel 74, as shown in FIG. 5A, the leading portion 32 of the shaft end 24 is guided by and/or positioned relative to the first pair of retention features 98 with the second shaft face 46 in communication with a radial space 99 between the opposing retention features 98. As shown in FIG. 5B, at a first insertion depth 92 greater than the bore depth 83, the leading edge 38 of the leading portion 32 protrudes into the fastener bore 80, such that when a fastener 12 is inserted into the fastener bore 80, the leading edge 38 of the shaft end 24 protruding into the fastener bore 80 interferes with a fastener 12 (not shown in FIG. 5B) and the fastener 12 exerts a displacing force 19 on the fastener 12, axially displacing the leading portion 32 of the shaft end 24 from the fastener bore 80 now containing the inserted fastener 12 (not shown in FIG. 5B) and into the clearance gap 16 defined by the counterbore 90 as shown in FIG. 5B. As displaced by the fastener 12, the shaft end 24 end may rotate relative to the first pair of retention features 98 such that the shaft end 24 is skewed relative to the channel 74, as shown in FIG. 5B by the shaft longitudinal axis 10 (indicated as 10A) skewed to the channel 74 longitudinal axis 10 (indicated as 10B), thus providing a visual indicator to an installer that the shaft end 24 has not been engaged in an installed position in the coupling element 70.

The leading portion 32 of the shaft end 24 displaced into the clearance gap 16 of the counterbore 90 may remain inserted in the channel 74 with the leading portion 32 disengaged from the coupling interface 76, such that as the fastener 12 now inserted in the fastener bore 80 is further engaged with the coupling element 70, the walls 73 of the coupling element 70 and the opposing retention features 98 are drawn together and toward the leading portion 32 positioned in the channel 74. As the walls 73 are initially drawn together, the clearance gap 16 provided by the counterbore 90 prevents the drawn together walls 73 and coupling interface 76 from retaining the leading portion 32 in the channel 74.

In the absence of an engaged shaft interface 28 to resist the clamping force 18, the opposing walls 73 and opposing retention features 98 are further drawn together by the engaging fastener 12 until the radial space 99 between the opposing retention features 98 is eliminated and interference of the opposing retention features 98 with each other provides a resisting force such that further engagement of the fastener 12 is ceased. The retention features 98, the radial space 99, and the counterbore base 88 may be configured and/or sized such that, in the absence of the shaft end 24 engaged with the coupling interface 76, the retention features 98 interfere with each other during engagement of the fastener 12 with the coupling element 70 prior to engagement of the leading portion 32 by the coupling interface 76, and such that it may be obvious to an installer that the shaft end 24 is not engaged in an installed position in the coupling element 70. The shape and radial size of the clearance gap 16 defined by the counterbore 90 contributes to preventing engagement of the leading portion 32 by the coupling interface 76 by providing sufficient clearance such that the leading portion 32 can be radially displaced within the channel 74 relative to the channel 74 longitudinal axis 10.

Referring now to FIGS. 1, 2C and 4C, the terminating portion 87 of the coupling element 70 may include a second pair of opposing retention features 98 which are partially defined by the coupling interface 76, and such that the fastener bore 80 is intermediate the first and second pairs of retention features 98. The second pair of retention features 98 may cooperate to orient the leading portion 32 to the coupling interface 76 as the shaft end 24 is progressively inserted in the terminating portion 87 of the channel 74, and/or may be configured to exert a clamping force 18 on the leading portion 32 with the shaft end 24 in the installed position. As described previously, a radial space 99 is provided between the opposing retention features 98 to prevent interference of the retention features 98 when the fastener 12 engages the coupling element 70 and the shaft end 24 in the installed position.

Referring now to FIGS. 5A-6B, a method of assembling the shaft coupling assembly 100 is illustrated, the method including progressively inserting the shaft end 24 of the shaft 20 into the channel 74 via the shaft receiving aperture 72 of the coupling element 70 from a first insertion depth 92 to a final installed depth 96. As shown in FIG. 5B, the axial length of the channel 74 intermediate the shaft receiving aperture 72 and the fastener bore 80, e.g., the axial length of the receiving portion 86 of the channel 74, is of sufficient length such that with the shaft end 24 inserted into the channel 74 at the first insertion depth 92 the leading end 38 of the leading portion 32 protrudes into the fastener bore 80 without engaging the leading portion 32 of the shaft interface 28 with the terminating portion 87 of the coupling interface 76, and without aligning the recess 30 with the fastener bore 80.

As shown in FIG. 5B, with the shaft end 24 inserted to the first insertion depth 92 such that the leading end 38 protrudes into the bore without engaging the shaft interface 28 and the terminating portion 87 of the coupling interface 76, a displacing force 19 may be exerted on the leading end 38 by the fastener 12 protruding into the fastener bore 80, causing the leading portion 32 to be displaced into the clearance gap 16 defined by the counterbore 90 of the receiving portion 86. The displacement of the shaft end 24 by the fastener 12 inserted in the coupling element 70 may skew the shaft longitudinal axis 10 (shown as 10A in FIG. 5B) relative to the coupling longitudinal axis 10 (shown as 10B in FIG. 5B), providing a visual indicator that the shaft end 24 is not engaged with the coupling element 70.

The method of assembling the shaft coupling assembly 100 further includes inserting the shaft end 24 in the channel 74 to a second inserted position shown in FIGS. 6A-6B, where at the second insertion depth 94 the leading portion 32 of the shaft end 24 is engaged with the receiving and terminating portions 86, 87 of the channel 74 such that the leading portion 32 protrudes into the fastener bore 80 as shown in FIGS. 6A-6B, thereby preventing a fastener 12 from being extended through the fastener bore 80 and engaging the engaging bore aperture 78. As shown in FIGS. 6A and 6B, in the second inserted position, the first face 44 is configured and oriented to protrude into the fastener bore 80 such that the fastener end 13 of the fastener 12 interferes initially with at least the first face 44 to resist further insertion of the fastener 12 into the fastener bore 80 in the direction 71 shown in FIG. 5A. As shown in FIG. 6B, the second face 46 is configured and oriented to protrude into the fastener bore 80 with the shaft end 24 in the second inserted position, such that the fastener end 13 of the fastener 12 interferes with the second face 46, and such that the first and second faces 44, 46 cooperate to resist further insertion of the fastener 12 into the fastener bore 80 in the direction 71.

As shown in FIG. 6B, at least a third shaft face 40 and a third coupling face 60 may cooperate to resist rotation of the shaft end 24 about the axis 10 in response to the force exerted by the fastener 12 on the first and/or second shaft faces 44, 46 protruding into the fastener bore, thus resisting further insertion of the fastener 12 into the fastener bore in the direction 71 by resisting axial rotation of the first and/or second shaft faces 44, 46 relative to the fastener bore 80.

Referring again to FIG. 1, the method further includes inserting the shaft end 24 in the channel 74 to the installed depth 96 shown in FIG. 1, wherein in the installed position the leading portion 32 of the shaft end 24 is engaged with the terminating portion 87 of coupling interface 76 and the trailing portion 33 of the shaft end 24 is engaged with the receiving portion 86 of the coupling interface 76, such that the recess 30 is aligned with the fastener bore 80 to receive a fastener 12 extended through the fastener bore 80 and the recess 30. The method continues with inserting the fastener 12 through the fastener bore 80 including the receiving bore aperture 77, the bore portion intermediate the receiving bore and the engaging bore apertures 77, 78 now partially defined by the recess 30 of the shaft end 24 at the installed depth 96, and the engaging bore aperture 78, and operatively fastening the fastener 12 to the coupling element 70 such that the opposing coupling walls 73 are drawn together to exert a clamping force 18 via the coupling interface 76 on the shaft interface 28 and such that the fastener 12 engages the recess 30 to axially restrain the shaft end 24 in the channel 74. As described previously herein the coupling interface 76 defines a plurality of coupling faces 50, and the shaft interface 28 defines a plurality of shaft faces 34, configured such that each respective shaft face 34 corresponds to a respective coupling face 50, wherein in the installed position, each respective shaft face 34 is in mating contact with its respective coupling face 50, wherein operatively fastening the fastener 12 to the coupling element 70 causes a clamping force 18 to be exerted by each coupling face 50 on its respective corresponding shaft face 34 to restrain the shaft end 24 in the channel 74 and/or to constrain radial rotation of the shaft end 24 about the longitudinal axis 10 and relative to the channel 74. For example, operatively engaging the fastener 12 inserted through the fastener bore 80 and recess 30 to the coupling element 70 causes the first coupling face 52 to exert a clamping force on the corresponding first shaft face 44, the second coupling face 58 to exert a clamping force on the corresponding second shaft face 46, the third coupling face 60 to exert a clamping force on the corresponding third shaft face 40, and so on.

As referred to herein, the first and second inserted positions each correspond to a first and second insertion depth 92, 94 where each of the first and second insertion depths 92, 94 represents a range of insertion depths 92, 94 defined by a condition associated with the inserted position, and such that it is not intended that either of the first and second inserted positions 92, 94 be limited to a singular axial location of the shaft end 24 relative to the channel 74. For example, the first insertion depth 92 represents and/or includes a range of insertion depths 92 beginning with a minimum first insertion depth 92 greater than the axial bore depth 83 at which the leading end 38 and/or leading portion 32 protrudes sufficiently into the fastener bore 80 to interfere with a fastener 12 inserted into the fastener bore 80 with the leading portion 32 not engaged to the coupling interface 76 of the terminating portion 87, wherein progressively inserting the leading portion 32 of the shaft end 24 into the channel 74 progressively increases the first insertion depth 92 to a maximum first insertion depth 92 substantially corresponding to the axial counterbore length 68. By way of example, the minimum second insertion depth 94 corresponds to the insertion depth where the leading portion 32 first engages the terminating portion 87, and the maximum second insertion depth 94 corresponds to the insertion depth where the receiving portion 32 adjacent the recess 30 and/or trailing portion 33 no longer substantially protrudes into the fastener bore 80.

Referring now to FIGS. 7A-7C, shown is a shaft 20 having a shaft end 24 including a second example configuration of a shaft interface 28 having a transverse cross-section defining a non-regular shape, and a coupling 70 (see FIG. 7C) including a second example configuration of a coupling interface 76, where the coupling interface 76 is configured to define a transverse cross-section having a non-regular shape corresponding to the non-regular shape of the shaft interface 28, such that the non-regular shape of the coupling interface 76 configured to mate with the non-regular shape of the shaft interface 28 with the shaft end 24 inserted in the channel 74. The transverse cross-section is defined by a plurality of shaft faces 34 defining the shaft interface 28 and shaft end 24. The shaft faces 34 may include a first shaft face 44 adjacent to a second shaft face 46, and at least a third face 60. The third face 60 may oppose or be non-adjacent to the first face 44 and may be of a different length than the first face 44. In the example shown, the shaft 20 and the coupling element 70 of FIGS. 7A-7C function substantially as described for the respective shaft 20 and the respective coupling element 70 of FIG. 1. As described previously herein, the example configuration of the non-regular shaped shaft interface 28 shown in FIGS. 7A-7C includes a plurality of shaft faces 34 including at least one flat shaft face 44, 40 defining a linear side of the non-regular shape, and at least one non-flat shaft face 46 defining a non-linear side of the non-regular shape. In the example shown in FIGS. 7A-7C, the non-linear side may be defined by a curved face 46. The first shaft face 44 defines a first length $L_{AB}$, and an opposing side 40 defines a second length $L_{CD}$, where the first and second lengths $L_{AB}$ and $L_{CD}$ are unequal. The opposing sides 44, 40 may be substantially parallel such that the first and second lengths $L_{AB}$ and $L_{CD}$ are vertical lengths of the respective shaft faces 44, 40. In the example shown in FIG. 7B, the vertical lengths $L_{AB}$, $L_{CD}$ are unequal, e.g., the first vertical length $L_{AB}$ is longer than the second vertical length $L_{CD}$, such that the non-regular shape of the cross-section shown in FIG. 3B is asymmetrical relative to the vertical axis 56 (see FIG. 2B). The first vertical length $L_{AB}$ is defined by the vertical length of the truncated first face 44, originates from reference point A, e.g., the intersection of the first and second shaft faces 44, 46, and is parallel to a plane defined by the longitudinal axis 10 and the vertical axis 56 (see FIGS. 1 and 2B), such that the first vertical length $L_{AB}$ corresponds to the radial height of the first face 44 relative to the longitudinal axis 10, and, as shown in FIG. 7C, is greater than the bore radial height 82 such that the first face 44 protrudes into the fastener bore 80 when the shaft end 24 is oriented to the coupling interface 76 and inserted into the channel 74 at either of a first inserted depth 92 and a second inserted depth 94.

The "non-regular shape" may be characterized by a radius $R_A$ drawn to a first intersection A between two adjacent sides, such as shaft faces 44, 46, and a radius $R_C$ drawn to another intersection C between two other adjacent shaft faces, as shown in FIG. 7B, where radii $R_A$ and $R_C$ are of different lengths. In the example shown in FIGS. 7A-7C, the shaft end 24 is configured as a truncated cylinder, also referred to as a "double D" shaft end, having opposing truncated flat surfaces 44, 40 which are substantially parallel to each other and disposed between opposing cylindrical surfaces 46. The shaft end 24 may be referred to as a "non-regular truncated cylinder," an "irregular truncated cylinder," or a "non-regular double D," characterized by the unequal lengths $L_{AB}$, $L_{CD}$ of the opposing truncated surfaces 44, 40. The example shown in FIGS. 7A-7C is non-limiting, and it is understood that the shaft end 24 may be configured to include a transverse cross-section defined by one of another non-regular shape, including one having non-parallel opposing sides of different lengths.

In another example shown in FIGS. 7A-7C, a "non-regular shape" of the coupling interface 76 shown in FIG. 7C may include a plurality of coupling faces 50 including at least one linear coupling face 52, 60 and at least one non-linear coupling face, which may be a coupling face 59 shown in FIG. 7C and/or a non-linear coupling face defined by the receiving portion 86 of the channel 74 (not shown) and configured to mate to the shaft face 46. The "non-regular shape" may include a first coupling face 52 having a length corresponding to, e.g., substantially the same as, length $L_{AB}$, and an opposing coupling face 60 having a different length corresponding to, e.g., substantially the same as, $L_{CD}$, e.g., such that the lengths of coupling faces 52, 60 are unequal. The opposing coupling faces 52, 50 may be substantially parallel. The "non-regular shape" may be characterized by a first coupling radius corresponding to the shaft radius $R_A$ shown in FIG. 7B, drawn to a first intersection between two adjacent coupling faces, and a second coupling radius corresponding to the shaft radius $R_C$ drawn to another intersection between two other adjacent coupling faces, such that the first and second coupling radii are of different lengths.

While the best modes for carrying out the invention have been described in detail, those familiar with the art to which this invention relates will recognize various alternative designs and embodiments for practicing the invention within the scope of the appended claims.

The invention claimed is:

1. A shaft coupling element comprising:
   a coupling wall defining a channel accessible via a shaft receiving aperture defined by the coupling wall and configured to receive a shaft end of a shaft;
   the channel defined by a coupling interface configured to mate to a shaft interface defined by the shaft end; and
   wherein the coupling interface defines a non-regular shape;
   a fastener bore defined by the coupling wall and configured to align with a fastener receiving recess defined by the shaft end with the shaft end inserted in an installed position, to receive a fastener through the bore and the recess;
   wherein the fastener bore is in communication with the channel and the coupling interface and characterized by an axial fastener bore depth and by a radial bore height;
   wherein the coupling interface is defined by a plurality of coupling faces including a first coupling face partially defining the fastener bore and configured to mate to a first shaft face defining the shaft interface;
   wherein the first coupling face is characterized by a height greater than the radial bore height such that the first shaft face protrudes into the fastener bore when the shaft end is inserted into the channel at a depth greater than the axial fastener bore depth and less than an installed depth;
   wherein the channel defines a counterbore in communication with the shaft receiving aperture of the coupling wall, wherein the counterbore:
      is characterized by an axial counterbore depth greater than the axial fastener bore depth;
      includes a counterbore base extending radially from the coupling interface; and
      defines a substantially radial gap corresponding to the radial width of the counterbore base and the axial counterbore depth.

2. The shaft coupling element of claim 1, wherein the channel includes:
   a receiving portion in communication with the shaft receiving aperture and the fastener bore;
   a terminating portion in communication with the fastener bore and defined by the coupling interface;
   wherein the shaft end inserted in the installed position includes a leading portion of the shaft end in communication with the fastener receiving recess engaged with the terminating portion of the channel and the fastener receiving recess aligned with the fastener bore; and
   wherein the leading portion of the shaft end inserted in the channel to a first inserted depth greater than the fastener bore depth and less than the installed depth protrudes into the fastener bore such that the shaft end interferes with the fastener bore receiving the fastener.

3. The shaft coupling element of claim 2, further comprising:
   the receiving portion including a pair of opposing retention features defining the shaft receiving aperture and defining a radial space therebetween;
   wherein the radial space is in communication with the channel; and
   each of the retention features is partially defined by the coupling interface and configured to orient the shaft interface to the coupling interface when the shaft end is received into the channel.

4. The shaft coupling element of claim 1, further comprising:
   a counterbore defined by the receiving portion;
   the counterbore having an axial counterbore depth greater than the axial fastener bore depth;
   wherein the leading portion of the shaft end inserted in the channel to a second inserted depth greater than the fastener bore depth and less than the axial counterbore depth is displaceable into the counterbore by the fastener received in the fastener bore, and such that the leading portion of the shaft end is not engaged by the coupling interface by the fastener bore receiving the fastener.

5. The shaft coupling element of claim 1, wherein:
   the coupling interface includes a plurality of coupling faces; and
   the non-regular shape is defined by the plurality of coupling faces.

6. The shaft coupling element of claim 5, wherein:
   the plurality of coupling faces includes a first coupling face, a second coupling face and at least a third coupling face;
   the first coupling face is adjacent the second coupling face such that the first and second coupling faces define a first included angle therebetween;

wherein the first included angle is not equal to a second included angle defined by the third coupling face and another of the plurality of coupling faces adjacent the third coupling face.

7. The shaft coupling element of claim 5, wherein:
the plurality of coupling faces includes a first coupling face having a first coupling face length and a second coupling face having a second coupling face length; and
the first coupling face length is not equal to the second coupling face length.

8. The shaft coupling element of claim 1, wherein the non-regular shape is configured as an irregular polygon.

9. The shaft coupling element of claim 1, wherein the non-regular shape is configured as a hybrid polygon including at least one linear side and at least one non-linear side.

10. A method of assembling a shaft and a shaft coupling element, wherein:
the shaft coupling element includes:
a coupling wall defining a channel accessible via a shaft receiving aperture of the coupling wall and configured to receive a shaft end of the shaft;
the channel including a coupling interface configured to mate to a shaft interface defined by the shaft end;
wherein the coupling interface defines a non-regular shape;
wherein the shaft interface defines a mating non-regular shape;
a fastener bore defined by the coupling wall and in communication with the channel and the coupling interface and defining an axial fastener bore depth;
the shaft end includes:
a fastener receiving recess defined by the shaft end and configured to align with the fastener bore with the shaft end inserted to an installed depth in the channel, such that a fastener is insertable through the fastener bore and the fastener receiving recess to retain the shaft end in the channel;
wherein the shaft interface is configured to protrude into the fastener bore with the shaft end inserted at a first inserted depth greater than the axial fastener bore depth and less than the installed depth;
the method comprising:
progressively inserting the shaft end of the shaft into the channel via the shaft receiving aperture from the first inserted depth to the installed depth;
wherein at the first inserted depth the shaft interface interferes with insertion of the fastener in the fastener bore;
inserting the fastener through the fastener bore and the fastener receiving recess with the shaft end inserted to the installed depth; and
operatively fastening the fastener to the coupling element such that the coupling interface exerts a clamping force on the shaft interface and the fastener engages the recess to restrain the shaft end in the channel at the installed depth.

11. The method of claim 10, wherein:
the coupling element includes a counterbore defined by a receiving portion of the channel and extending radially from the coupling interface;
the counterbore having an axial counterbore depth greater than the axial fastener bore depth;
wherein the shaft end inserted in the channel to a second inserted depth greater than the fastener bore depth and less than the axial counterbore depth is displaceable into the counterbore such that the shaft end is not engaged with the coupling interface by the fastener bore receiving the fastener;
the method further comprising:
with the shaft end inserted in the channel at the second inserted depth, inserting the fastener into the fastener bore such that the fastener interferes with a leading end of the shaft interface protruding into the fastener bore; and
displacing the shaft end into the counterbore using the fastener and such that the shaft is displaced axially relative to the channel.

12. A shaft coupling assembly comprising:
a shaft coupling element including a coupling wall defining a channel accessible via a shaft receiving aperture defined by the coupling wall and configured to receive a shaft end of a shaft;
the channel defined by a coupling interface configured to mate to a shaft interface defined by the shaft end;
wherein the coupling interface defines a non-regular shape;
wherein the shaft interface defines a mating non-regular shape;
a fastener bore defined by the coupling wall and in communication with the channel and the coupling interface and defining an axial fastener bore depth;
a fastener receiving recess defined by the shaft end and configured to align with the fastener bore with the shaft end inserted to an installed depth in the channel, such that a fastener is insertable through the fastener bore and the fastener receiving recess to retain the shaft end in the channel;
wherein the shaft interface is configured to protrude into the fastener bore with the shaft end inserted at a first inserted depth greater than the axial fastener bore depth and less than the installed depth;
wherein:
the shaft coupling element includes a counterbore defined by a receiving portion of the channel and extending radially from the coupling interface;
the counterbore has an axial counterbore depth greater than the axial fastener bore depth; and
wherein the shaft end inserted in the channel to a second inserted depth greater than the fastener bore depth and less than the axial counterbore depth is displaceable into the counterbore such that the shaft end is not engaged with the coupling interface by the fastener bore receiving the fastener.

13. The shaft coupling assembly of claim 12, wherein the non-regular shape is configured as one of:
an irregular polygon; and
a hybrid polygon including at least one linear side and at least one non-linear side.

14. The shaft coupling assembly of claim 12, wherein:
the coupling interface is defined by a plurality of coupling faces including a first coupling face in communication with the fastener bore;
the plurality of coupling faces defines the non-regular shape;
the shaft interface is defined by a plurality of shaft faces configured to mate to the plurality of coupling faces, and including a first shaft face configured to mate to the first coupling face and in communication with the fastener receiving recess; and
the first shaft face is configured to protrude into the fastener bore with the shaft end inserted at an inserted depth greater than the axial fastener bore depth and less than the installed depth.

15. The shaft coupling assembly of claim 14, wherein:
the plurality of shaft faces including a second shaft face adjacent to the first shaft face and in communication with the fastener receiving recess; and
the second shaft face is configured to protrude into the fastener bore with the shaft end inserted at an inserted depth greater than the axial fastener bore depth and less than the installed depth.

16. The shaft coupling assembly of claim 15, wherein:
the plurality of shaft faces including a third shaft face;
wherein one of:
 the first and second shaft faces define a first included angle therebetween, wherein the first included angle is not equal to a second included angle defined by a third shaft face and another of the plurality of shaft faces adjacent the third shaft face; and
 the first shaft face has a first shaft face length and the second shaft face has a second shaft face length, wherein the first shaft face length is not equal to the second shaft face length.

\* \* \* \* \*